Patented July 7, 1953

2,644,824

UNITED STATES PATENT OFFICE 2,644,824

ACYLAMINO ALKYLSULFONE ANTHRAQUINONE VAT DYESTUFFS

Walter Jenny, Reinach, near Basel, and Walter Kern, Sissach, Switzerland, assignors to Ciba Limited, Basel, Switzerland, a Swiss firm No Drawing. Application February 5, 1951, Serial No. 209,514. In Switzerland February 15, 1950

7 Claims. (Cl. 260—372)

According to this invention valuable vat dyestuffs are made by treating an anthraquinone derivative, which contains in one of the benzene rings of the anthraquinone structure at least one amino group in an $\alpha$-position and in the other of the said benzene rings an alkyl sulphone group in a $\beta$-position, with an acylating agent.

The anthraquinone derivatives serving as starting materials for the present process may contain, for example, only one amino group in an $\alpha$-position, for example, in the 1-position, or two amino groups in the same benzene ring of the anthraquinone structure. In the latter case the two amino groups must necessarily be in the 1:4-position, that is to say in para-position with respect to one another. There may also be used as starting materials for the present process amino-anthraquinone derivatives which contain in the same benzene ring in addition to an $\alpha$-amino group a further substituent which must obviously be of such character as is not injurious in vat dyestuffs, for example, an acylamino group in para position with respect to the amino group and especially a benzoylamino group.

All these anthraquinone derivatives must further contain an alkyl sulphone group in a $\beta$-position in the benzene ring of the anthraquinone structure which does not contain the aforesaid $\alpha$-amino group or $\alpha$-amino groups. When the orientation of the aminoanthraquinone nucleus is such, as is the case hereinafter, that the amino group occupies the 1- or 4-position then the $\beta$-sulphone group will occupy the 6- or 7-position.

As alkyl sulphone groups there are to be understood the usual groups —SO$_2$-alkyl, where in the present case the —SO$_2$— group is bound directly in a $\beta$-position of the anthraquinone nucleus and the alkyl radicals contain no groups imparting solubility in water. As alkyl sulphone groups within the meaning of the present invention there come into consideration, for example, alkyl sulphone groups with an alkyl radical with 1 to 6 carbon atoms, in particular such as contain an alkyl radical with 1 to 4 carbon atoms, as e. g. the methyl, ethyl, n-propyl, isopropyl or n-butyl sulphone group.

As examples of starting materials for the present process there may be mentioned 1-amino-6-methyl-sulphone-anthraquinone, 1-benzoylamino-4-amino-6-methyl-sulphone anthraquinone, 1-amino-6-isopropyl-sulphone-anthraquinone, 1:4-diamino-6-isopropyl-sulphone anthraquinone and especially 1:4-diamino-6-methyl sulphone anthraquinone. Products which are isomeric with these monoamino- or acylamino compounds and contain the alkyl sulphone group in 7-position can also be used as starting materials for the instant process.

The 1-amino-6- and -7-alkyl sulphone-anthraquinones can be prepared by treating with sodium hydrosulfide in an aqueous medium at a slightly raised temperature, advantageously at 60–70° C., the mixture of isomers obtained by nitrating a 2-alkylsulphone-anthraquinone and consisting mainly of 1-nitro-6- and -7-alkylsulphone-anthraquinone. In this operation, the 1-nitro-6-alkyl-sulphone-anthraquinone is reduced into the 1-amino-6-alkylsulphone-anthraquinone. In the case of the 1-nitro-7-alkylsulphone-anthraquinone, there occurs not only a reduction of the nitro group, but also a replacement of the alkyl sulphone group by the mercapto-group, wherefore the 1-amino-7-mercapto-anthraquinone is obtained. The latter forming a soluble sodium salt, it can easily be separated from the simultaneously formed 1-amino-6-alkyl-sulphone-anthraquinone; the mercapto group can then be alkylated again and the alkyl-mercapto-group converted into the alkyl-sulphone group by oxidation. The 1-amino-6-methylsulphone-anthraquinone can also be obtained by the method of Example 1.

As acylating agents there may be used in the present process, more especially, carboxylic acids or reactive functional derivatives thereof, for example, their acid chlorides. Especially valuable products are obtained in many cases by using as an acylating agent a functional derivative of a benzene carboxylic acid, for example, benzoyl chloride or corresponding derivatives of such benzene carboxylic acids as contain in the benzene nucleus substituents which do not impart solubility in water, for example, alkyl groups, especially methyl groups, alkoxy groups especially methoxy groups, halogen atoms such as chlorine or bromine, and also sulphone groups, for instance, alkyl-sulphone groups.

The vat dyestuffs obtainable by the process described above can also be made by oxidizing to a sulphone group the alkyl mercapto group in an anthraquinone derivative which contains in one of the benzene rings of the anthraquinone structure at least one acylamino group in an $\alpha$-position and in the other of the said benzene rings an alkyl mercapto group in a $\beta$-position.

The 1-acylamino- or 1:4-diacylamino-anthraquinones containing as a substituent in the 6- or 7-position the alkylmercapto group used as starting materials in this form of the process can be prepared by converting 1-amino-6- or -7- bromo- or chlor-anthraquinone or 1:4-diamino-6-bromo or -chloranthraquinone with an alkali hydrosulphide into the corresponding mercapto compound, reacting the latter with an alkyl halide, and finally acylating the amino group present in the resulting product. Alternatively, the aforesaid halogen anthraquinones may be reacted directly with an alkyl-sodium mercaptide before the aforesaid acylation is carried out.

The oxidation of the anthraquinone derivatives containing the alkyl-mercapto groups to the sulphones may be carried out for example, with perbenzoic acid in nitrobenzene or more advantageously with peroxides, especially hydrogen peroxide in trichloracetic acid or mixtures of chlorinated acetic acids, which last-mentioned method appears to be applicable quite generally in the case of the oxidation of difficultly soluble mercapto-ethers.

The vat dyestuffs obtainable by the processes described above or the modification just described correspond to the general formula

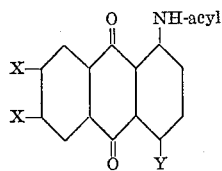

in which one X represents hydrogen and the other X a sulphone group, and Y represents hydrogen or a —NH-acyl group. They are valuable vat dyestuffs, and can be used as pigment dyestuffs and for dyeing or printing by the usual methods a very wide variety of fibers, especially cellulose fibers such as cotton, linen and artificial silk and staple fibers of regenerated cellulose. If desired, they can be used for dyeing and printing also in the form of their leuko ester salts for example of sulfuric acid which can be prepared in accordance with known methods.

The following examples illustrate the invention the parts and percentages being by weight unless otherwise stated and the relationship of parts by weight to parts by volume being the same as that of the kilogram to the liter:

*Example 1*

63 parts of 1:4-diamino-6-methylsulphone-anthraquinone are suspended in 850 parts of dry nitrobenzene. After the addition of 70 parts of benzoyl chloride the whole is stirred at 135–140° C. for 2½ hours. The dyestuff which precipitates in the form of Bordeaux red crystals upon cooling is separated by filtering with suction, washed well with boiling alcohol, and dried. It dissolves in concentrated sulfuric acid with a pale red coloration and dyes cotton from an olive vat Bordeaux red tints which upon soaping yield pure violet shades which are especially fast to light. The dyestuff is also suitable for printing by the usual potash method.

1:4-diamino-6-methyl-sulphone-anthraquinone can be prepared, for example, for 1-amino-6-methyl-sulphone-anthraquinone or from a mixture of the 6- and 7-isomers, by nitrating the oxamic acid and subsequently reducing the nitro group by one of the usual methods. 1-amino-4-nitro-6-methylsulphone-anthraquinone when recrystallized from nitrobenzene forms red needles (N calculated=8.09 per cent., N found=8.21 per cent.).

1 - amino - 6 - methyl - sulphone - anthraquinone can be prepared as follows:

229 parts of 2-methylsulphone-anthraquinone are slowly introduced into 480 parts of sulfuric monohydrate at room temperature. After stirring the temperature is raised to 80° C., and then a mixture of 64 parts of nitric acid of 96 per cent. strength and 64 parts of sulfuric monohydrate is introduced dropwise in the course of 1 hour, during which the temperature rises to 90° C. After stirring for a further ½ hour at 100° C. the whole is allowed to cool and is cautiously introduced into ice and water, filtered with suction, and the filter residue is washed neutral and dried. In order to separate the product from isomers, for example, 130 parts of the nitration product are introduced at 10° C. into 1000 parts of sulfuric acid of 95 per cent. strength and stirred until dissolution has occurred. 188 parts of sulfuric acid of 50 per cent. strength are then introduced dropwise at 10–15° C. in the course of about ½ hour and the whole is subsequently stirred at 10–12° C. for 3½ hours. The precipitated 1 - nitro - 6 - methyl - sulphone-anthraquinone is separated by filtering with suction, washed with sulfuric acid of 88 per cent. strength and introduced into ice and water. The resulting suspension is filtered with suction, and the filter residue is washed neutral and dried. By treating the product in aqueous suspension with sodium hydrosulfide at 64–67° C. there is obtained 1- amino - 6 - methyl - sulphone - anthraquinone which crystallizes in the form of red-brown needles and melts at 249° C. (uncorrected) (N calculated=4.65 per cent., N found= 4.72 per cent.; S calculated=10.63 per cent., S found=10.76 per cent.).

*Example 2*

30 parts of 1-amino-6-methyl-sulphone-anthraquinone, (see Example 1) and 21 parts of diphenyl-4-carboxylic acid are suspended in 360 parts of dry nitrobenzene, and, after the addition of 16 parts of thionyl chloride, the whole is heated, while stirring, up to 135° C. in the course of 1 hour. After stirring for a further 2 hours at 130–135° C. the whole is allowed to cool. The dyestuff which precipitates in the form of yellow needles is separated by filtering with suction, washed well with boiling alcohol and dried. It dissolves in concentrated sulfuric acid with a brown-yellow coloration and dyes cotton from a red-brown vat pure yellow tints which are fast to light.

*Example 3*

19 parts of 3-methyl-sulphone-benzoic acid are suspended in 480 parts of dry nitrobenzene and after the addition of 14 parts of thionyl chloride and 0.3 part of pyridine the whole is stirred at 90–100° C. for 1½ hours. 31 parts of 1-benzoylamino - 4 - amino - 6 - methylsulphone - anthraquinone are then added. The temperature rises slowly with further stirring and remains at 120–130° C. for 2 hours. The dyestuff which precipitates upon cooling in the form of a finely crystalline red powder, is separated by filtering with suction, and washed well with boiling alcohol and dried. It dissolves in concentrated sulfuric acid with a brown-red coloration and dyes cotton from an olive green vat fast violet tints.

1 - benzoylamino - 4 - amino - 6 - methylsulphone - anthraquinone can be obtained by the usual methods by benzoylating and subsequently reducing the 1-amino-4-nitro-6-methyl-sulphone-anthraquinone described in Example 1.

When recrystallized from ortho-dichlorobenzene the product forms small violet crystals.

Example 4

13 parts of 1:4-diamino-6-isopropyl sulphone-anthraquinone are suspended in 250 parts of dry nitrobenzene and, after the addition of 15 parts of benzoyl chloride, are stirred for 2 hours at 135–140° C. The dyestuff which on cooling precipitates in dark red crystals is suction-filtered, well washed with nitrobenzene and boiling alcohol, and dried. It dissolves with an olive coloration in concentrated sulfuric acid and dyes cotton from an olive-colored vat red tints which on soaping yield fast, pure blue-red tints.

A dyestuff of similar properties is obtained if the 1:4 - diamino - 6 - isopropylsulphone - anthraquinone in this example is replaced by 1:4 - diamino - 6 - n - butylsulphone - anthraquinone.

1:4 - diamino - 6 - isopropylsulphone - anthraquinone may be prepared, e. g. from 1-amino-6-isopropylsulphone-anthraquinone or from a mixture of 6- and -7-isomers, by nitrating the oxamic acid and then reducing the nitro group by one of the usual methods. When recrystallized from nitrobenzene, 1:4-diamino-6-isopropylsulphone-anthraquinone forms small violet crystals.

A pure 1 - amino - isopropylsulphone - anthraquinone (probably 1-amino-6-isopropylsulphone-anthraquinone) can be produced in the following manner: 252 parts of 2-isopropylsulphone-anthraquinone (prepared by isopropylating sodium anthraquinone-2-mercaptide, followed by the oxidation of the 2-isopropylmercapto-anthraquinone with chromium trioxide in glacial acetic acid) are dissolved in 480 parts of monohydrate at room tempearture. After this, the reaction mass is nitrated in the course of one hour at 80–83° C. with a mixture of 65 parts of nitric acid (of 96 per cent. strength) and 65 parts of monohydrate, then stirred for half an hour at 100° C., and allowed to cool. It is then transferred into ice water, suction-filtered, washed neutral, and dried. The powdered residue is dissolved in 3000 parts of sulfuric acid (of 98 per cent. strength). The solution is diluted by adding water or dilute acid slowly drop by drop while stirring until the acid is of 75 per cent. strength, then stirred for 2 hours at 0–5° C., suction-filtered, washed with sulfuric acid of 75 per cent. strength, washed neutral, and dried. 14.6 parts of this nitro-isopropylsulphone-anthraquinone mixture are ground overnight in 40 parts of water. After the addition of 660 parts of water and 150 parts of sodium hydrosulfide solution (of 30 per cent. strength), the whole is stirred for an hour and a half at 90° C., suction-filtered while hot, washed neutral, and dried. By recrystallization from ortho-dichlorobenzene, amino - isopropylsulphone - anthraquinone is obtained in the form of flat red needles which melt at 218–220° C. (C calculated=62 per cent., C found, 61.81 per cent.; H calculated=4.59 per cent., H found=4.47 per cent; N calculated=4.2 per cent., N found=4.1 per cent.).

Example 5

11 parts of diphenyl-4-carboxylic acid are suspended in 280 parts of dry nitrobenzene and after the addition of 8 parts of thionyl chloride stirred for an hour and a half at 90–100° C. After that, 16.4 parts of 1-amino-isopropysulphone-anthraquinone, obtained according to the last paragraph of Example 4, are added. The temperature is gradually raised while stirring and maintained at 125–130° C. for 2 hours. After cooling, the dyestuff which has precipitated in the form of yellow crystals, is suction-filtered, washed with nitrobenzene and boiling alcohol and dried. It dissolves in concentrated sulfuric acid with a yellow coloration and dyes cotton from a brown vat fast yellow tints.

Example 6

4 parts of 1 - (4' - chloro-benzoylamino - 6-methylmercapto - anthraquinone (prepared by acylating 1-amino-6-methylmercapto-anthraquinone by one of the usual methods) are dissolved at 70° C. in 100 parts of trichloracetic acid. After the addition of 5 parts of hydrogen peroxide (of 30 per cent. strength), the reaction mass is stirred for two hours at 90–95° C. The new dyestuff is precipitated by the addition of cold alcohol, suction-filtered, washed with alcohol, and dried. After recrystallizing it once from nitrobenzene, there are obtained orange-yellow needles which show no depression of the melting point with the 1-(4'-chloro-benzoylamino)-6-methyl-sulphone-anthraquinone obtained from 1-amino-6-methylsulphone-anthraquinone and para-chlorobenzoyl chloride by the method of Example 2.

By the same method, other acylamino-alkylmercaptoanthraquinones, as e. g. 1-(4'-phenylbenzoylamino) - 6 - methylmercapto - anthraquinone, can also be oxidized.

Example 7

1.5 parts of the dyestuff obtained as described in the first paragraph of Example 1 are vatted in 200 parts of water with the addition of 6 parts by volume of caustic soda solution of 36° Bé. and 3 parts of sodium hydrosulfide at 40° C. The resulting stock vat is added to a dyebath which contains in 2000 parts of water 6 parts by volume of caustic soda solution of 36° Bé. and 3 parts of sodium hydrosulfite. 100 parts of cotton are entered into the dyebath at 25° C., 40 parts of sodium chloride are added after ¼ hour, and dyeing is carried on for 1 hour at 25–30° C. The cotton is then squeezed, oxidized in the air, rinsed, acidified and again thoroughly rinsed, and then soaped at the boil with a solution containing, per liter, 3 parts of soap and 1 part of anhydrous sodium carbonate. A pure violet tint which is fast to light is obtained.

By preparing with the dyestuff of Example 1 an ordinary printing paste containing potash thickening, there is likewise obtained by the normal printing process a pure violet print which is fast to light.

What is claimed is:

1. A vat dyestuff of the formula

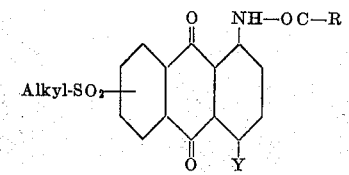

wherein the alkyl-SO$_2$-radical stands in a β-position of the anthraquinone nucleus and the alkyl group contains up to 6 carbon atoms, —OC—R stands for the radical of a benzene monocarboxylic acid which is free from substituents imparting solubility, and Y stands for a member selected from the group consisting of a hydrogen atom and the radical —NH—OC—R wherein —OC—R has the meaning already given.

2. A vat dyestuff of the formula

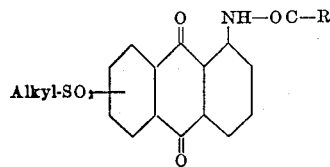

wherein the alkyl-SO₂-radical stands in a β-position of the anthraquinone nucleus and the alkyl group contains up to 6 carbon atoms, and —OC—R stands for the radical of a benzene monocarboxylic acid which is free from substituents imparting solubility.

3. A vat dyestuff of the formula

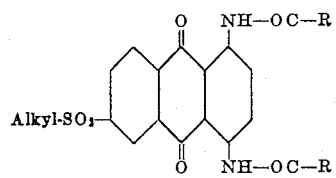

wherein the alkyl group contains up to 6 carbon atoms and each —OC—R stands for the radical of a benzene monocarboxylic acid which is free from substituents imparting solubility.

4. The vat dyestuff of the formula

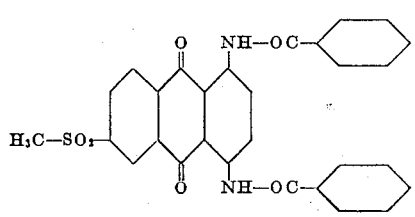

5. The vat dyestuff of the formula

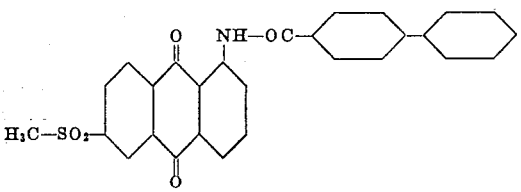

6. The vat dyestuff of the formula

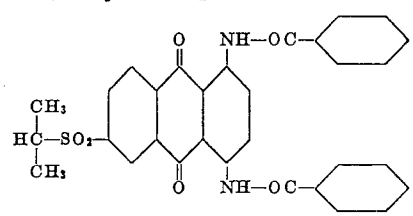

7. A vat dyestuff of the formula

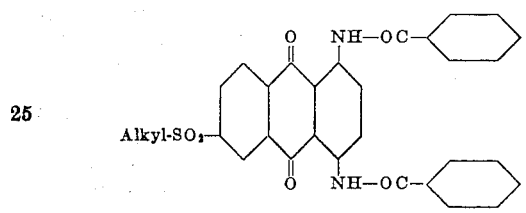

wherein the alkyl group contains up to 4 carbon atoms.

WALTER JENNY.
WALTER KERN.

References Cited in the file of this patent
UNITED STATES PATENTS

| Number | Name | Date |
|---|---|---|
| 2,176,630 | Klein | Oct. 17, 1939 |
| 2,190,751 | Zerweck et al. | Feb. 20, 1940 |

OTHER REFERENCES

Annalen der Chemie, vol. 393, pages 148–151 (1912).